United States Patent [19]

Urayama et al.

[11] Patent Number: 5,101,308
[45] Date of Patent: Mar. 31, 1992

[54] TAPE REEL FOR MAGNETIC TAPE CASSETTE

[75] Inventors: Kiyoshi Urayama, Miyagi; Shigeru Tateno, Tochigi, both of Japan

[73] Assignee: Sony Corporation, Tokyo, Japan

[21] Appl. No.: 412,621

[22] Filed: Sep. 26, 1989

Related U.S. Application Data

[63] Continuation of Ser. No. 922,335, Oct. 23, 1986, abandoned.

[30] Foreign Application Priority Data

Oct. 29, 1985 [JP] Japan ............... 60-166217[U]

[51] Int. Cl.⁵ .................................. G11B 23/023
[52] U.S. Cl. .................................. 360/132; 242/198
[58] Field of Search ............... 360/132; 242/198–199

[56] References Cited

U.S. PATENT DOCUMENTS

| | | | |
|---|---|---|---|
| 4,484,248 | 11/1984 | Ogiro et al. | 360/132 |
| 4,631,619 | 12/1986 | Hashizume et al. | 360/132 |
| 4,632,335 | 12/1986 | Dickson et al. | 360/132 |
| 4,633,355 | 12/1986 | Harada | 242/198 |
| 4,674,000 | 6/1987 | Lee | 360/132 |
| 4,689,702 | 8/1987 | Oishi et al. | 360/132 |
| 4,692,746 | 9/1987 | Budin et al. | 360/132 |
| 4,715,558 | 12/1987 | Fair et al. | 242/199 |
| 4,723,731 | 2/1988 | Posso | 242/198 |
| 4,752,046 | 6/1988 | Wulfing | 242/199 |

FOREIGN PATENT DOCUMENTS

| | | |
|---|---|---|
| 0140636 | 5/1985 | European Pat. Off. . |
| 0168971 | 1/1986 | European Pat. Off. . |
| 169545 | 1/1986 | European Pat. Off. ............ 360/132 |
| 2445583 | 12/1979 | France . |
| 2018224 | 10/1979 | United Kingdom . |
| 2040878 | 9/1980 | United Kingdom . |

Primary Examiner—John H. Wolff
Attorney, Agent, or Firm—Ronald P. Kananen

[57] ABSTRACT

A tape reel for a magnetic tape cassette can accurately hold upper and lower reel flanges parallel to each other. The tape reel for a magnetic tape cassette comprises a reel hub assembly including a first reel flange and a cylindrical reel hub integral with the first reel flange and extending from the center of the first flange. The cylindrical reel hub has a support surface at the end remote from the first reel flange onto which to mount a second reel flange. A fastener and a second reel support projection are formed on the support surface of the reel hub. The fastener fastens the second reel flange on the support surface. The second reel support projection is formed on the support surface. The second reel flange support projection has a plane opposing the second reel flange accurately parallel to the first reel flange. Since the area of the second reel support projection is substantially smaller than that of the support surface of the reel hub, it is possible to hold the face opposing the second reel flange accurately parallel to the first flange. Therefore, the second reel flange supported by the second reel flange support projection can be accurately held parallel to the first reel flange.

15 Claims, 5 Drawing Sheets

TAPE REEL FOR MAGNETIC TAPE CASSETTE

This application is a continuation of application Ser. No. 06/922,335, filed Oct. 23, 1986, now abandoned.

BACKGROUND OF THE INVENTION

1. Field of the Invention

The present invention relates generally to a magnetic tape cassette. More specifically, the invention relates to a tape reel having upper and lower reel flanges and housed within a magnetic tape cassette casing. Further particularly, the invention relates to a structure for attaching a reel flange onto one end of a reel hub.

2. Description of the Prior Art

The Japanese Utility Model Second (Examined) Publication (Jikko) Showa 59-35898 discloses a tape reel for a compact video tape (8 mm video tape) cassette. The disclosed tape reel predominantly comprises a reel hub assembly and an integrally attached lower reel flange. The reel hub assembly is generally cylindrical and has an inner cylindrical section with an essentially cylindrical recess for receiving a reel shaft of a recording and/or reproducing apparatus. The reel hub assembly also has an upper reel flange support surface. An upper reel flange is mounted on the upper reel flange support surface of the reel hub assembly.

A center pin and a plurality of fastening projections are formed on the upper reel flange support surface of the reel hub assembly. The center pin extends through a central aperture in the upper reel flange for centering the upper reel flange with respect to the reel hub assembly. The fastening projections similarly extend through apertures in the upper reel flange surrounding the central aperture. The fastener projections are crimped after engaging the corresponding apertures of the upper reel flange so as to fasten the upper reel flange to the upper reel flange support surface.

With regard to this conventional tape reel, it is difficult to hold the plane of the upper reel flange support surface accurately flat and accurately parallel to the lower reel flange due to normal production errors and tolerances.

SUMMARY OF THE INVENTION

Therefore, it is an object of the present invention to provide a tape reel for a magnetic tape cassette, which can accurately hold upper and lower reel flanges parallel to each other.

Another object of the invention is to provide a fitting structure for fitting a reel flange on a support surface while holding the reel flange accurately parallel to the other reel flange.

In order to accomplish the aforementioned and other objects, a tape reel for a magnetic tape cassette, according to the present invention, comprises a reel hub assembly including a first reel flange and a cylindrical o reel hub integral with the first reel flange and extending from the center of the first flange. The cylindrical reel hub has a support surface at the end remote from the first reel flange onto which to mount a second reel flange. A fastener means and a second reel support projection are formed on the support surface of the reel hub. The fastener means fastens the second reel flange on the support surface. The second reel support projection is formed on the support surface. The second reel flange support projection has a plane opposing the second reel flange accurately parallel to the first reel flange.

Since the area of the second reel support projection is substantially smaller than that of the support surface of the reel hub, it is possible to hold the face opposing the second reel flange accurately parallel to the first flange. Therefore, the second reel flange supported by the second reel flange support projection can be accurately held parallel to the first reel flange.

In the preferred construction, the second reel support projection is of annular configuration.

According to one aspect of the invention, a tape reel assembly for a magnetic tape cassette comprises a reel hub having an end surface extending from one end thereof essentially perpendicular to an axis of the reel hub, a first flange to be mounted on the one end of the reel hub and to be fixed to the other end of reel hub by means of a fastening means, and means, associated with the end surface of the reel hub, for supporting the second flange precisely parallel to the first flange.

According to another aspect of the invention, a tape reel assembly for a magnetic tape cassette comprises a reel hub having an end surface extending from one end thereof essentially perpendicular to an axis of the reel hub, a first flange integrally formed with the reel hub and extending perpendicular to the axis of the reel hub at the other end thereof, a second flange to be mounted on the one end of the reel hub and to be fixed to the other end of the reel hub by means of a fastening means, and means, associated with the end surface of the reel hub, for supporting the second flange precisely parallel to the first flange.

In the preferred construction, the supporting means limits the area of contact between mating surfaces of the second flange and the end surface. The means supports the second flange above the plane of the end surface. In practice, the means comprises an annular projection formed on the end surface and extending along the circumference of the reel hub.

The reel hub comprises an outer cylinder onto which a magnetic tape is wound and an inner cylinder for receiving a reel shaft of an associated magnetic tape recording and/or reproducing apparatus, the inner cylinder having the end surface with an annular projection supporting the second flange away from the plane of the end surface.

In the alternative embodiment, the reel hub comprises an outer cylinder onto which a magnetic tape is wound and an inner cylinder for receiving a reel shaft of an associated magnetic tape recording and/or reproducing apparatus, the outer cylinder having the end lying on the plane above the end surface so that the end of the outer cylinder supports the second flange above the end surface of the inner cylinder.

A further aspect of the invention, a magnetic tape cassette comprises a cassette casing, a magnetic tape housed within the cassette casing, a pair of tape reel assemblies, each comprising a reel hub having an end surface extending from one end thereof essentially perpendicular to an axis of the reel hub, a first flange integrally formed with the reel hub and extending perpendicular to the axis of the reel hub at the other end thereof, a second flange to be mounted on the one end of the reel hub and to be fixed to the other end of reel hub by means of a fastening means, and means, associated with the end surface of the reel hub, for supporting the second flange precisely parallel to the first flange.

According to a still further aspect of the invention, a magnetic tape cassette comprises upper and lower housing portions assembled together to define a housing of substantially rectangular configuration having end walls and an opening along a side of the housing between the end walls, tape reel assemblies rotatably contained in the housing and having tape wound thereon, each comprising a reel hub having an end surface extending from one end thereof essentially perpendicular to an axis of the reel hub, a first flange integrally formed with the reel hub and extending perpendicular to the axis of the reel hub at the other end thereof, a second flange to be mounted on the one end of the reel hub and to be fixed to the other end of reel hub by means of a fastening means, and means, associated with the end surface of the reel hub, for supporting the second flange precisely parallel to the first flange, guide means in the housing leading the tape between the reels in a run extending across the opening, lid means having ears at its opposite ends pivotally engageable with the end walls to define a pivot axis of the lid means, about which the latter is movable between an open position exposing the run of the tape for withdrawal from the housing and a closed position in which the lid means covers the tape run, and coil spring means including a coil portion and angularly displaced leg portions extending from the coil portion, first and second spring anchor means located on at least one of the ears and being tentatively engageable with the leg portions of the coil spring means for initial positioning of the latter relative to the lid means, and third spring anchor means on one of the portions of the housing adjacent one of the end walls and to which one of the leg portions of the spring means is transferred when assembling the lid means in respect to the one portion of the housing, whereupon the spring means urges the lid means to one of the open and closed positions relative to the housing.

A magnetic tape cassette further comprises latch means mounted adjacent the one end wall of the housing and having an engaged condition for locking the lid means in the closed position and a released condition for permitting movement of the lid means to the open position, and in which the spring means also acts on the latch means when the housing portions are assembled together for urging the latch means to the engaged condition thereof. The latch means includes a latch element pivoted on the one end wall and a keeper element on the one ear held by the latch element with the lid means in the closed position when the latch means is in the engaged condition, and in which the keeper element also functions as one of the first and second spring anchor means.

In the preferred construction, the upper and lower housing portions have substantially rectangular top and bottom walls, respectively, and flanges along the margins of the top and bottom walls engaging each other at a plane of separation substantially parallel with the top and bottom walls when the housing portions are brought together in a direction normal to the plane for defining a peripheral structure of the housing which includes the end walls, the ears have pivot pins extending therefrom to define the pivot axis, and the flange of at least the upper housing portion has cutouts in the edge thereof to receive and locate the pivot pins in respect to the housing.

The coil portion is disposed on the one of the pivot pins extending from the one ear, and the first and second spring anchor means extend from the one ear at substantially diametrically opposed locations in respect to the one pivot pin. The first and second spring anchor means have notches receiving the leg portions and torsionally stressing the coil portion so that the leg portions are urged to remain in the notches for avoiding inadvertent removal of the coil portion from the one pivot pin pending the mounting of the lid means on the upper housing portion. The coil portion urges the leg portions angularly apart in one direction and against the first and second anchor means, and the third anchor means is disposed on the flange of the upper housing portion and has an oblique surface and a normal anchor surface, one of the leg portions being movable against the force of the coil portion away from the respective one of the first and second anchor means and being deflected by the oblique surface onto the normal surface of the third anchor means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
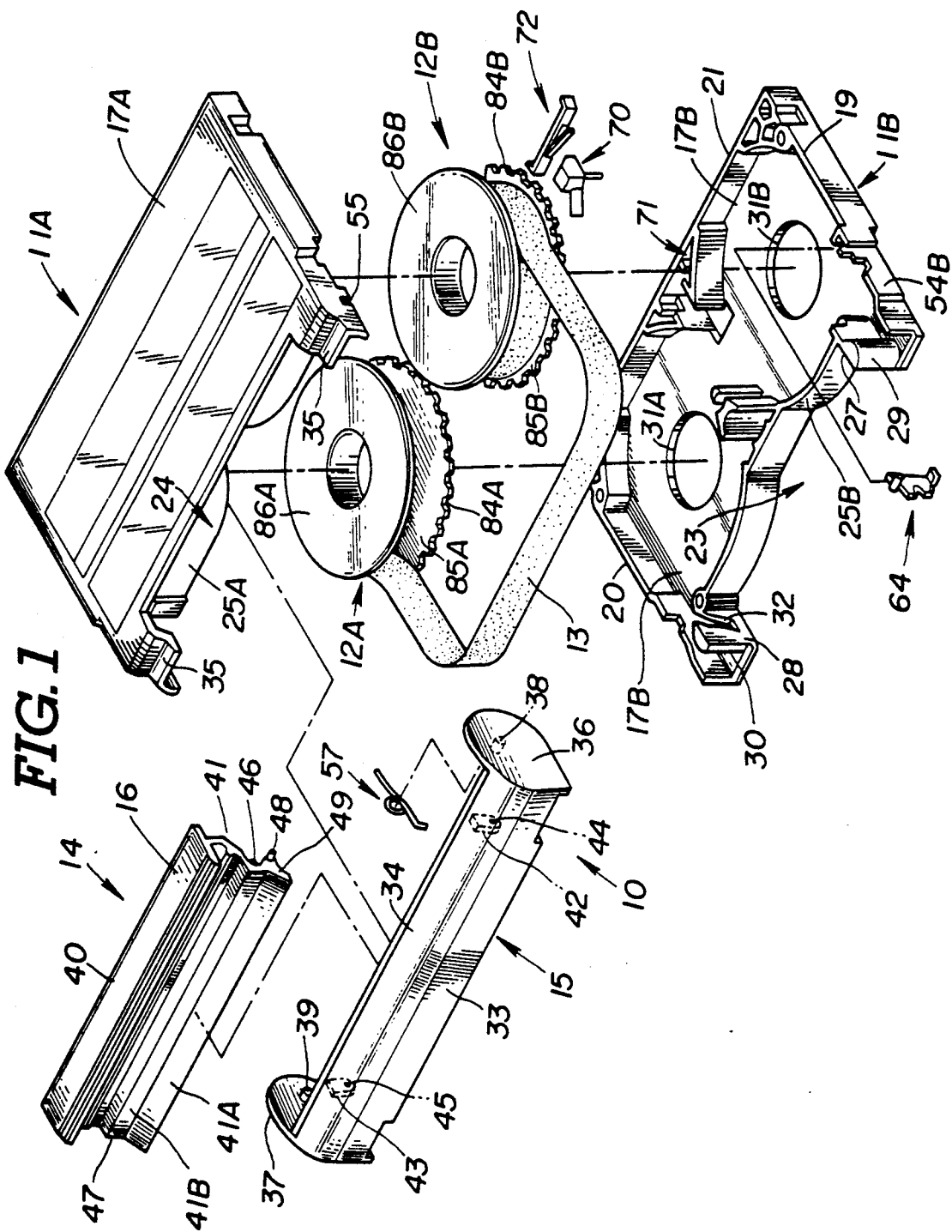
FIG. 1 is an exploded perspective view of a magnetic tape cassette in which the preferred embodiment of a tape reel according to the invention is employed.

Referring now to the drawings, FIG. 1 shows a tape cassette 10 of a type in which the preferred embodiment of a tape reel assembly according to the present invention is used and is provided primarily for background in understanding the principle application of the tape reel assembly according to the invention. Reference may be made to copending U.S. Pat. application Ser. No. 651,452, filed Sept. 17, 1984, now U.S. Pat. No. 4,633,355 assigned to the assignee of the instant invention, for further details concerning FIG. 1. As is apparent, the tape cassette 10 is of a type intended for use in an 8-mm video tape recorder (VTR).

The tape cassette 10 comprises a substantially rectangular cassette housing 11 composed of upper and lower housing portions 11A and 11B, a pair of tape reel assemblies generally indicated by reference numerals 12A and 12B rotatably retained side-by-side in the housing 11 and having magnetic tape 13 wound on their reels. The cassette 10 includes a lid assembly 14 and a front lid assembly 15. The lid assembly 14 is pivotally mounted on the housing 11 for movement between open and closed positions. In the open position of the lid assembly 14, the segment of tape between the tape reel assemblies 12A and 12B is exposed for withdrawal from the housing 11 while, in the closed position, the lid assembly 14 covers or encloses the tape both in front of and behind the tape.

The upper and lower housing portions 11A and 11B have generally rectangular top and bottom walls 17A and 17B, respectively, and end walls 19 and 20 extend along the margins of both the top and bottom walls 17A and 17B, and engage each other along a plane of separation which is substantially parallel to the walls 17A and 17B when the housing portions 11A and 11B are brought together vertically, that is, in the direction normal to the plane of separation, the flanges 18A, 18B define the periphery of the housing. The periphery of the housing also includes a back wall 21 along one of the relatively long sides of the rectangular housing. At the front or other long side of the housing, an opening between the back lid assembly 14 and the front lid assembly 15 extends nearly all the way between the end walls 19 and 20. The bottom wall 17B has an approximately trapezoidal cutout 23 communicating with the tape opening. The ends of the cutout 23 are spaced inwardly from the end walls 19 and 20.

A rectangular cutout 24 approximately as wide as the cutout 23 is formed in the forward portion of the top wall 17A and has a depth smaller than the depth of the cutout 23 as measured at the middle of the housing 11. A flange 25A with curving portions depends from the top wall 17A behind the cutout 24 and mates with a flange 25B having similarly curving portions directed upwardly from the bottom wall 17B along the back edge of the cutout 23. When the housing portions 11A and 11B are brought together vertically, the flanges 25A and 25B on the upper and lower housings 11A and 11B mate to define a partition by which a space containing the reels 12A and 12B within the housing is isolated from the cutout 24 and the cutout 23.

At the opposite ends of the cutout 23, the housing portion 11B is formed or molded with upstanding walls 27 and 28 directed forwardly from the opposite ends of the flange 25B. The walls 27 and 28 are higher than the flange 25B so as to extend freely from the bottom wall 17B to the top wall 17A in the assembled cassette 10. The outwardly directed surfaces of the walls 27 and 28 which are spaced from the end walls 19 and 20 are formed with rounded or semi-cylindrical surface portions 29 and 30 acting as tape guides at the opposite ends of the tape opening. The bottom wall 17B has laterally spaced apart circular apertures 31A and 31B, opposing to which reel hub section 73 of tape reel 0 assemblies 12A and 12B, respectively are loosely received within the housing 11. Through the apertures 31A and 31B, drive shafts or spindles (not shown) of a VTR can conventionally engage the reel hubs 73 of the tape reel assembly 12A and 12B when the cassette 10 is operatively positioned in the VTR.

The segment of tape 13 which extends between the tape reel assemblies 12A and 12B is directed forwardly from the tape reel assemblies around guides 29 and 30 so as to establish a tape run extending across the opening. The walls 27 and 28 have curving, approximately vertical guide grooves 32 in their inwardly directed surfaces for controlling pivoting movement of an inner lid member 16 relative to the outer lid member of the front end assembly 15 during movement of the latter between opened and closed positions of the lid assembly 14.

The outer lid member of the front end assembly 15 includes a front wall portion 33 which is laterally elongated so that its length is approximately equal to the distance between the end walls 19 and 20 of the housing 11, a shallow top wall portion 34 extending from the upper edge of the front wall portion and having a width smaller than the depth of the cutout 24 in the top wall 17A so as to be engageable over depressed, shelf-like extensions 35 of the top wall 17A at the opposite ends of the cutout 24.

Ears 36 and 37 directed rearwardly from the opposite ends of the front and top wall portions 33 and 34 have inwardly directed pivots or trunions 38 and 39 for pivotally mounting the outer lid member on the end walls 19 and 20 respectively. When thus pivotally connected with the housing 11, the outer lid member 15, in its closed position, has its wall portion 33 covering the front surface of the tape run, while the top portion 34 of the lid member 15 extends over the tape run. The inner lid member 14 is approximately as long as the cutout 24 and includes an elongated head portion 40 o dimensioned so as to span the gap between the longitudinal edge of the cutout 24 and the top wall portion 34 of the outer lid member 15 in the closed position of the latter.

The inner lid member 16 includes an angled skirt portion 41 extending generally downwardly and forwardly from the head portion 40 along the length of the latter. The skirt portion 41 is dimensioned so that when the lid assembly 14 is in its closed position, the skirt portion 41 extends downwardly behind the tape run with the lower edge part 41A of the skirt portion 41 substantially abutting the lower edge portion of the front wall portion 33 under the tape run. Thus, the tape run between the tape reel assemblies 12A and 12B is substantially enclosed and protected within a space defined between the lid members 15 and 16 in the closed position of the assembly 14 so that there is no possibility of dust accumulation or other injurious contact with the back surface of the tape run through the cutout 23.

Mounting lugs 42 and 43 are preferably mounted integrally with the top wall portion 34 of the outer lid member 15 at laterally spaced locations corresponding to the ends of the inner lid member 16 and have openings 44 and 45 for pivotally receiving aligned pins 46 and 47 extending from opposite ends of an intermediate part 41B of the skirt portion 41. The lug members 42 and 43 are desirably laterally resilient while the end surfaces of the pivot pins 46 and 47 are oblique or slanted to permit such pivot pins to snap into the respective holes 44 and 45 of the mounting pins. Upon engagement of the pins 46 and 47 in the holes of lugs 42 and 43, the inner lid member 16 is mounted on the outer lid member 15 for pivotable movement with respect to the latter.

Movements of the inner lid member 16 relative to the outer lid member 15 are affected in response to pivotal movement of the outer lid member 15 relative to the housing 11 by means of follower pins 48 at the opposite ends of the free edge part 41A of the skirt portion 41. The follower pins 48 are slidably engageable in the cam or guide grooves 32 in the end walls 27 and 28. The illustrated shape of each of the cam or guide grooves 32 is selected to insure that the lower edge part 41A of the skirt portion 41 comes close to the lower edge of the front wall portion 33 only when the lid assembly 14 is approximately at its wholly closed position in order to avoid any contact of the lid assembly with the tape run during movement of the opened and closed positions of the lid assembly.

In order to urge the lid assembly 14 to its closed position, the tape cassette 10 further includes a coil spring 57 associated with the pivot pin 38. While only one coil spring 57 is shown, it will be understood that a second coil spring is associated with the other pivot pin 39.

The tape cassette 10 further includes a latch element 64 mounted adjacent the end wall 19 of the housing 11. The latch element 64 has an engaged condition for locking the lid assembly 14 in its closed position and a releasing or disengaged position for permitting movement of the lid assembly to its opened position. The coil spring 57 is thus provided for urging the lid assembly 14 to its closed position but also acts on the latch element 64 when the housing portions 11A and 11B are assembled together for urging the latch element 64 to the engaged condition thereof.

The cassette 10 further includes a brake assembly which acts as a reel lock and includes a brake body 70 and a brake guide structure 71 in the housing 11 at a location between the tape reel assemblies 12A and 12B adjacent the side of the housing remote from the opening 22. The brake guide structure 71 operates to guide the brake body 70 in a plane parallel to the plane 0 of separation of the housing portions 11A and 11B. A pair of diverging, resilient, blade-like extensions project from the brake body 70 to the tape reel assemblies 12A and 12B, respectively, and engage two peripheries, 84A and 84B, on lower flanges 85A, 85B of the tape reel assemblies 12A and 12B respectively. A plate spring member 72 which is also installed in the housing urges the brake body 70 to its extended position.

Figure 2:
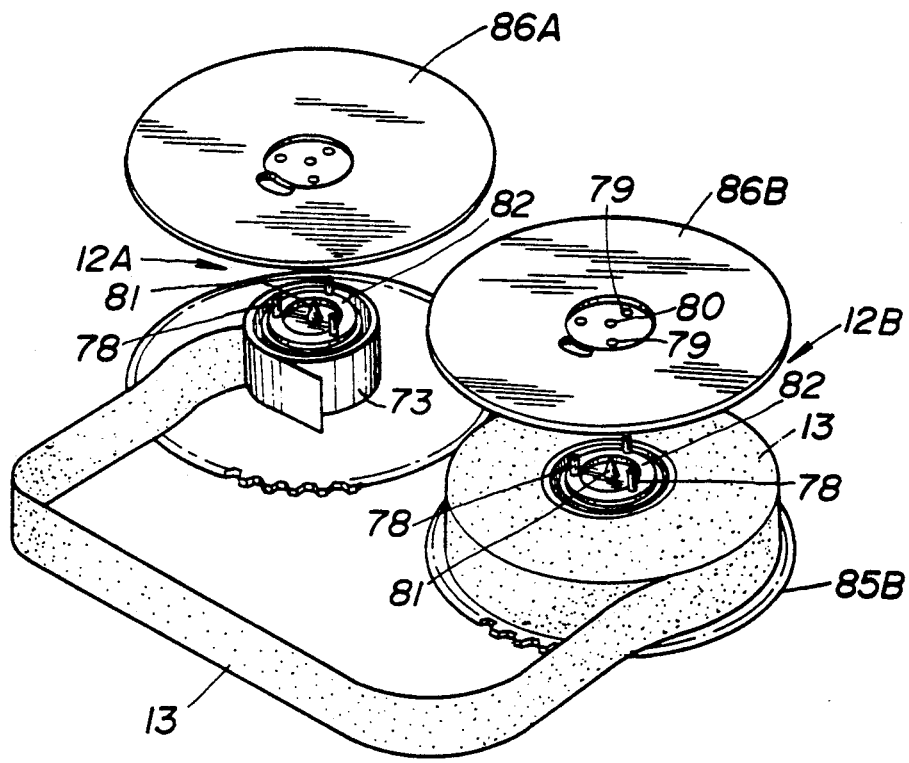
FIG. 2 is a perspective view of two tape reel assemblies as given in FIG. 1 onto which a magnetic tape is wound.

FIG. 2 shows the tape reel assemblies 12A and 12B in the magnetic tape cassette 10 of FIG. 1. Each of the tape reel assemblies 12A and 12B generally comprises the lower flange 85, an upper flange 86 and the hub section 73. The lower flange 85 and the hub section 73 are formed integrally of a synthetic resin. The assembly of the lower flange 85 and the hub section 73 may be formed by molding or any other appropriate process. On the other hand, the upper flange 86 is formed separately from the aforementioned assembly of the lower flange 85 and the hub section 73.

Figure 3:
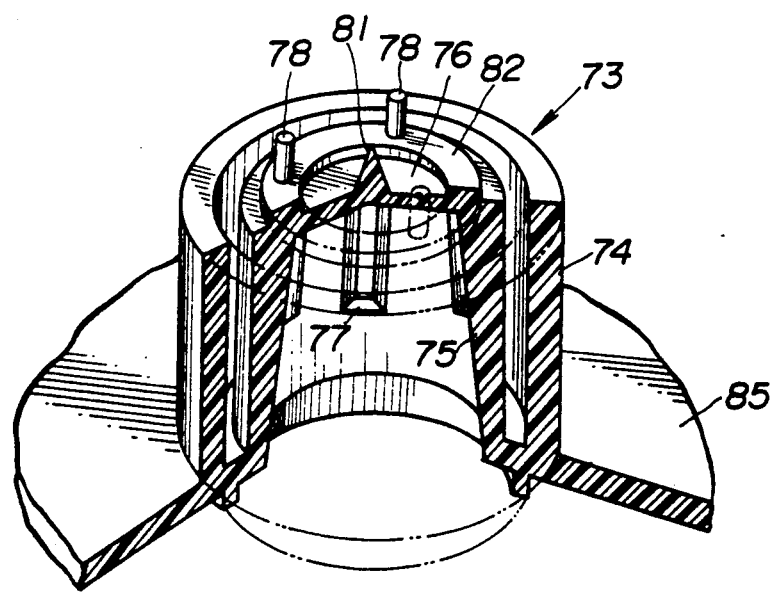
FIG. 3 is a cut-away view of a reel hub and a lower flange constituting the first embodiment of the tape reel assembly according to the present invention.
Figure 4:
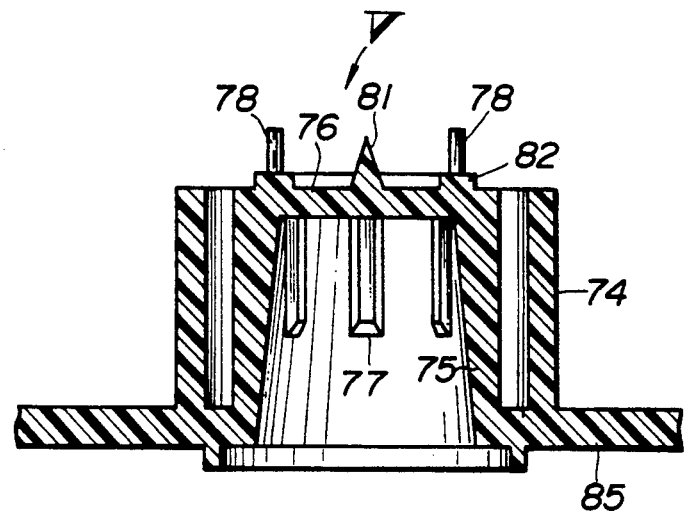
FIG. 4 shows a vertical cross-section through the assembly of the reel hub and the lower flange of FIG. 3.
Figure 5:
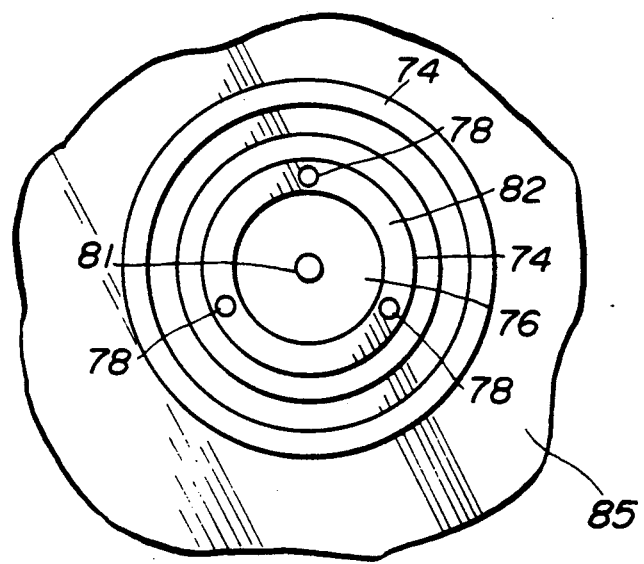
FIG. 5 is a plan view of the reel hub assembly of FIG. 3, as viewed along the arrow V of FIG. 4.

As shown in FIGS. 3, 4 and 5, the hub section 73 comprises an outer cylindrical section 74 and an inner cylindrical section 75. The outer cylindrical section 74 and the inner cylindrical section 75 are coaxially arranged with respect to the center axis of the tape reel assembly 12A or 12B. The outer cylindrical section 74 serves as a reel hub onto which magnetic tape 13 is wound. The inner cylindrical section 75 has a top wall 76 extending substantially horizontal so as to close the top end of the inner cylindrical section 75. The lower end of the inner cylindrical section 75 is open to receive a reel shaft (not shown) of the VTR. Radially inward projections 77 on the inner periphery of the inner cylindrical section are designed to engage with a head with radial projections of the reel shaft of the VTR. Therefore, the inner cylindrical section 75 serves as a reel shaft receptacle.

A plurality of pins 78 extend upwardly from the upper surface of the top wall 76 of the inner cylindrical section 75. The pins 78 are arranged radially symmetrically about the central axis of the tape reel assembly. Each of the pins 78 is of generally conical configuration and designed to pass through an aperture 79 in the upper flange 86. The upper flange 86 also has a central aperture 80. The central aperture 80 receives a central positioning pin 81 extending from the center of the upper surface of the top wall 76 of the inner cylindrical section 75.

A substantially annular projection 82 is formed on the upper surface of the top wall 76. In the shown embodiment, the annular projection 82 extends along the circumferential edge across the position of the fastening pins 78. The upper surface of the annular projection 82 lies in a plane parallel to but higher than the top end of the outer cylindrical section 74. The plane in which the upper surface of the annular projection lies is parallel to the lower flange 85.

Figure 6:
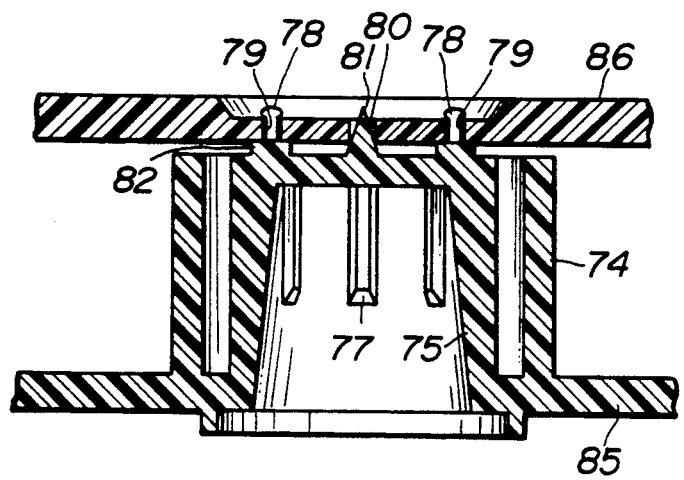
FIG. 6 shows a cross-section through the assembly of the reel hub and the lower flange of FIG. 3, as attached with an upper flange to form the first embodiment of the tape reel assembly.

As set forth, the upper flange 86 is mounted on the top wall 76 of the inner cylindrical section 75 by engagement between the apertures 79 and 80, and the fastening pins 78 and the center positioning pin 81. As particularly shown in FIG. 6, the lower surface of the upper flange 86 abuts the upper surface of the annular projection 82 so as to be supported above the upper surface of the top wall 76 with a small clearance therebetween. During assembly, the fastening pins 78 are crimped after the upper flange 86 is placed on the top wall 76 of the inner cylindrical section 75 as set forth above. The fastening pins 78 are crimped by thermal welding, such as ultra-sonic welding.

In the shown construction, the upper surface of the annular projection 82 is substantially smaller than the upper surface of the top wall 76. Therefore, it is easier to make the upper surface of the annular projection 82 precisely parallel to the lower flange 85. Therefore, the upper flange 86 can be supported precisely parallel to the lower flange 85.

Furthermore, even though the portions of the annular projection 82 near the fastening pins 78 may be deformed by the heat of thermal welding, the upper flange 86 can be held parallel to the lower flange by the remaining unaffected portions of the annular o projection 82.

Figure 7:
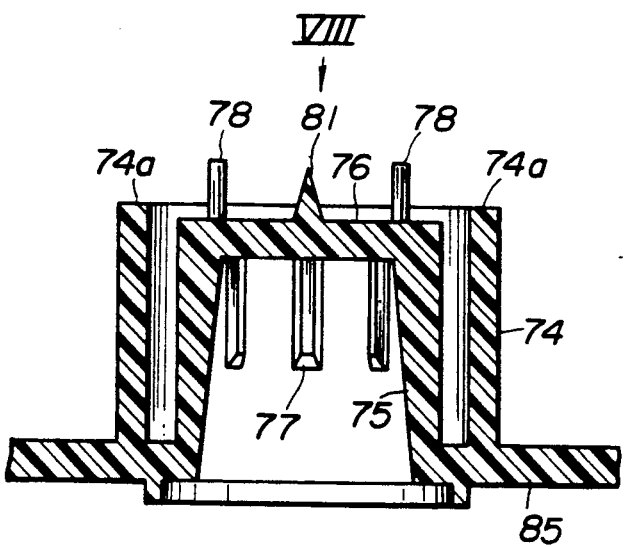
FIG. 7 shows a cross-section through an assembly comprising a reel hub and a lower flange constituting a part of another embodiment of the tape reel assembly according to the invention.
Figure 8:
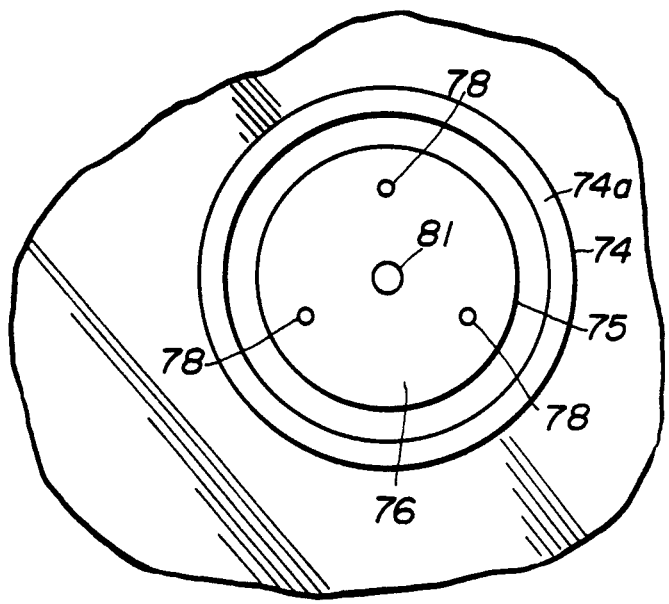
FIG. 8 is a plan view of the reel hub assembly of FIG. 7, as viewed along the arrow VIII of FIG. 7.
Figure 9:
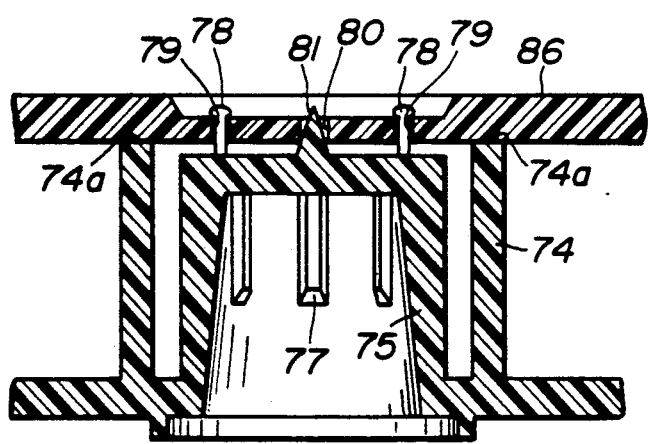
FIG. 9 shows a cross-section through an assembly comprising a reel hub and a lower flange constituting a part of another embodiment of the tape reel assembly according to the invention.

FIGS. 7 to 9 show the second embodiment of the tape reel assembly according to the present invention. In this embodiment, the top wall 76 of the inner cylindrical section 75 is flat and has no annular projection. In this embodiment, the top end 74a of the outer cylindrical section lies in a horizontal plane located above the upper surface of the top wall 76 of the inner cylindrical section 75. The top end 74a therefore forms an annular upper flange supporting surface lying in a horizontal plane precisely parallel to the lower flange 85.

As in the first embodiment, the upper flange 86 is mounted on the top end 74a of the outer cylindrical section 74, leaving a small clearance from the upper surface of the top wall 76 of the inner cylindrical section. As a result, irregularities on the upper surface of the top wall 76 and deformation of the portions around the fastening pins 78 due to the heat of thermal welding will not affect the orientation of the upper flange 86.

As will be appreciated herefrom, the present invention can be implemented in various forms to support the upper flange precisely parallel to the lower flange. For instance, the projection on the top wall 76 of the inner cylindrical section 75 need not necessarily be annular as set forth in the first embodiment. The annular projection in the first embodiment can be replaced by a plurality of projections on the upper surface of the top wall 76. It may also be possible to provide an annular projection or a plurality of small projections on the lower surface of the upper flange in order to reduce the influence of unevenness on the upper surface of the top wall of the inner cylindrical section.

In addition, although the present invention has been disclosed in terms of the tape reel assembly specifically adapted to 8-mm VTR tape cassettes, it is not intended to limit the invention of tape reel assembly thereto. As will be easily appreciated, the tape reel assembly of the invention is applicable to any type of magnetic tape cassette which requires a tape reel assembly with upper and lower flanges. Therefore, the invention should be understood to include all possible embodiments and modifications to embodiments which can be implemented without departing from the principles of the invention set out in the appended claims.

What is claimed is:

1. A tape reel assembly for a magnetic tape cassette, comprising:
   a hub section having axially-spaced, opposed, substantially parallel, upper and lower end wall surfaces, each of said upper and lower end wall surfaces respectively extending essentially perpendicularly to a central axis of said hub section;
   a lower flange integrally formed on said lower end wall surface of said hub section and extending substantially perpendicularly to said axis of said hub section;
   an upper flange, formed separately from said hub section and lower flange, structurally adapted to be mounted on the upper end wall surface of said hub section and to be fixed to the upper end wall surface of the hub section by means of fastening pins for securing said upper flange to said upper end wall surface; and
   a third annular outermost surface integral with said upper end wall surface of said hub section axially extending relative to said upper end wall surface and mating with said upper flange so that said upper flange is spaced from said upper end wall surface and is precisely parallel to said lower flange in part because the contact between a surface of said upper flange and said third surface is less that of said upper end wall surface without said third surface.

2. A tape reel assembly as set forth in claim 1, wherein said third surface limits the area of contact between mating surfaces of said upper flange and said upper end wall surface.

3. A tape reel assembly as set forth in claim 1, wherein the third surface comprises an annular projection formed on said upper end wall surface and extending along the circumference of said hub section.

4. A tape reel assembly as set forth in claim 1, wherein said hub section comprises an outer cylindrical section onto which a magnetic tape is wound and an inner cylindrical section for receiving a reel shaft of an associated magnetic tape recording and/or reproducing apparatus, wherein the third surface comprises an annular projection on said inner cylindrical section, said annular projection supporting said upper flange away from the plane of said upper end wall surface.

5. A tape reel assembly as set forth in claim 1, wherein said hub section comprises an outer cylindrical section onto which a magnetic tape is wound and an inner cylindrical section for receiving a reel shaft of an associated magnetic tape recording and/or reproducing apparatus, wherein the third surface is on said outer cylindrical section above said upper end wall surface to support said upper flange above said upper end wall surface.

6. A tape reel assembly for a magnetic tape cassette, comprising:
   an elongated, cylindrical hub section having axially-spaced, opposed, substantially parallel, upper and lower end wall surfaces, each of said upper and lower end wall surfaces respectively extending essentially perpendicular to a central axis of said hub section;
   a lower flange integrally formed on said lower end wall surface of said hub section and extending substantially perpendicularly to said axis of said hub section;
   an upper flange, formed separately from said hub section and lower flange, structurally adapted to be mounted on the upper end wall surface of said hub section and to be fixed to the upper end wall surface of the hub section by means of fastening pins for securing said upper flange to said upper end wall surface; and
   a third annular outermost surface integral with said upper end wall surface of said hub section axially extending relative to said upper end wall surface and mating with said upper flange so that said upper flange is spaced from said upper end wall surface and is precisely parallel to said lower flange in part because the contact between a surface of said upper flange and said third surface is less that of said upper end wall surface without said third surface.

7. A tape reel assembly as set forth in claim 6, wherein said third surface limits the area of contact between mating surfaces of said upper flange and said upper end wall surface.

8. A tape reel assembly as set forth in claim 6, wherein said third surface comprises an annular projection formed on said upper end wall surface and extending along the circumference of said hub section.

9. A tape reel assembly as set forth in claim 6, wherein said hub section comprises an outer cylindrical section onto which a magnetic tape is wound and an inner cylindrical section for receiving a reel shaft of an associated magnetic tape recording and/or reproducing apparatus, wherein said third surface comprises an annular projection on said inner cylindrical section, said annular projection supporting said upper flange away from the plane of said upper end wall surface.

10. A tape reel assembly as set forth in claim 6, wherein said hub section comprises an outer cylindrical section onto which a magnetic tape is wound and an inner cylindrical section for receiving a reel shaft of an associated magnetic tape recording and/or reproducing apparatus, wherein said third surface is on said outer cylindrical section above said upper end wall surface to support said upper flange above said upper end wall surface.

11. A magnetic tape cassette comprising:
    a cassette casing;

a magnetic tape housed within said cassette casing;

a pair of tape reel assemblies, each comprising an elongated cylindrical hub section having axially-spaced, opposed, substantially parallel, upper and lower end wall surfaces, each of said upper and lower end wall surfaces respectively extending essentially perpendicular to a central axis of said hub section;

a lower flange integrally formed on said lower end wall surface of said hub section and extending substantially parallel to said axis of said hub section;

an upper flange, formed separately from said hub section and lower flange, structurally adapted to be mounted on the upper end wall surface of said hub section and to be fixed to the upper end wall surface of the hub section by means of fastening pins for securing said upper flange to said upper end wall surface; and a third annular outermost surface integral with said upper end wall surface of said hub section axially extending relative to said upper end wall surface and mating with said upper flange so that said upper flange is spaced from said upper end wall surface and is precisely parallel to said lower flange in part because the contact between a surface of said upper flange and said third surface is less that of said upper end wall surface without said third surface.

12. A magnetic tape cassette as set forth in claim 11, wherein said third surface limits the area of contact between mating surfaces of said upper flange and said upper end wall surface.

13. A magnetic tape cassette as set forth in claim 11, wherein said third surface comprises an annular projection formed on said upper end wall surface and extending along the circumference of said hub section.

14. A magnetic tape cassette as set forth in claim 11, wherein said hub section comprises an outer cylindrical section onto which a magnetic tape is wound and an inner cylindrical section for receiving a reel shaft of an associated magnetic tape recording and/or reproducing apparatus, wherein said third surface comprises an annular projection on said inner cylindrical section, said annular projection supporting said upper flange away from the plane of said upper end wall surface.

15. A tape reel assembly as set forth in claim 11, wherein said hub section comprises an outer cylindrical section onto which a magnetic tape is wound and an inner cylindrical section for receiving a reel shaft of an associated magnetic tape recording and/or reproducing apparatus, wherein said third surface is on said outer cylindrical section above said upper end wall surface to support said upper flange above said upper end wall surface.

* * * * *